United States Patent [19]
Vandervort et al.

[11] Patent Number: 5,250,090
[45] Date of Patent: Oct. 5, 1993

[54] SEPARATION DEVICES

[75] Inventors: Christian L. Vandervort, Falmouth; Paul G. LaHaye, Kennebunk, both of Me.

[73] Assignee: HPS Merrimack, Inc., Portland, Me.

[21] Appl. No.: 890,804

[22] Filed: Jun. 1, 1992

[51] Int. Cl.⁵ ............................................. B01D 46/04
[52] U.S. Cl. ..................... 95/272; 55/269; 55/523
[58] Field of Search ............ 55/80, 96, 97, 269, 55/523, DIG. 30

[56] References Cited

U.S. PATENT DOCUMENTS

| | | | |
|---|---|---|---|
| 4,053,293 | 10/1977 | Combs | 55/269 |
| 4,684,378 | 8/1987 | Bratten | 55/96 |
| 4,764,190 | 8/1988 | Israelson et al. | 55/269 |
| 4,823,549 | 4/1989 | Moser | 55/DIG. 30 X |
| 5,019,142 | 5/1991 | Waschkuttis | |

OTHER PUBLICATIONS

Vandervort, "Factors Influencing Ash Particle Deposition in an Impact Separator at High Velocities and Temperatures", pp. 1 to 13, Engineering Foundation Conference, Mar. 10-15, 1991.

Primary Examiner—Charles Hart
Attorney, Agent, or Firm—William G. Rhines

[57] ABSTRACT

Embodiments of this invention include devices for removing particles, such as the fly ash from gaseous effluent produced by the combustion of pulverized coal, comprising arrays of ceramic rods that are contained within a housing having ingress and egress openings for the effluent. The rods are so oriented as to create tortuous paths for the effluent and thereby effectively render the rods in the aggregate into an impact separator. The rods are made from material which exhibits electrical resistance such that when the are sufficiently energized electrically, ash accumulated thereon liquefies or otherwise looses its adhesive strength, releasing such accumulations which then, by gravity and/or the drag forces of the gas stream separate from the rods for subsequent collection and removal.

19 Claims, 3 Drawing Sheets

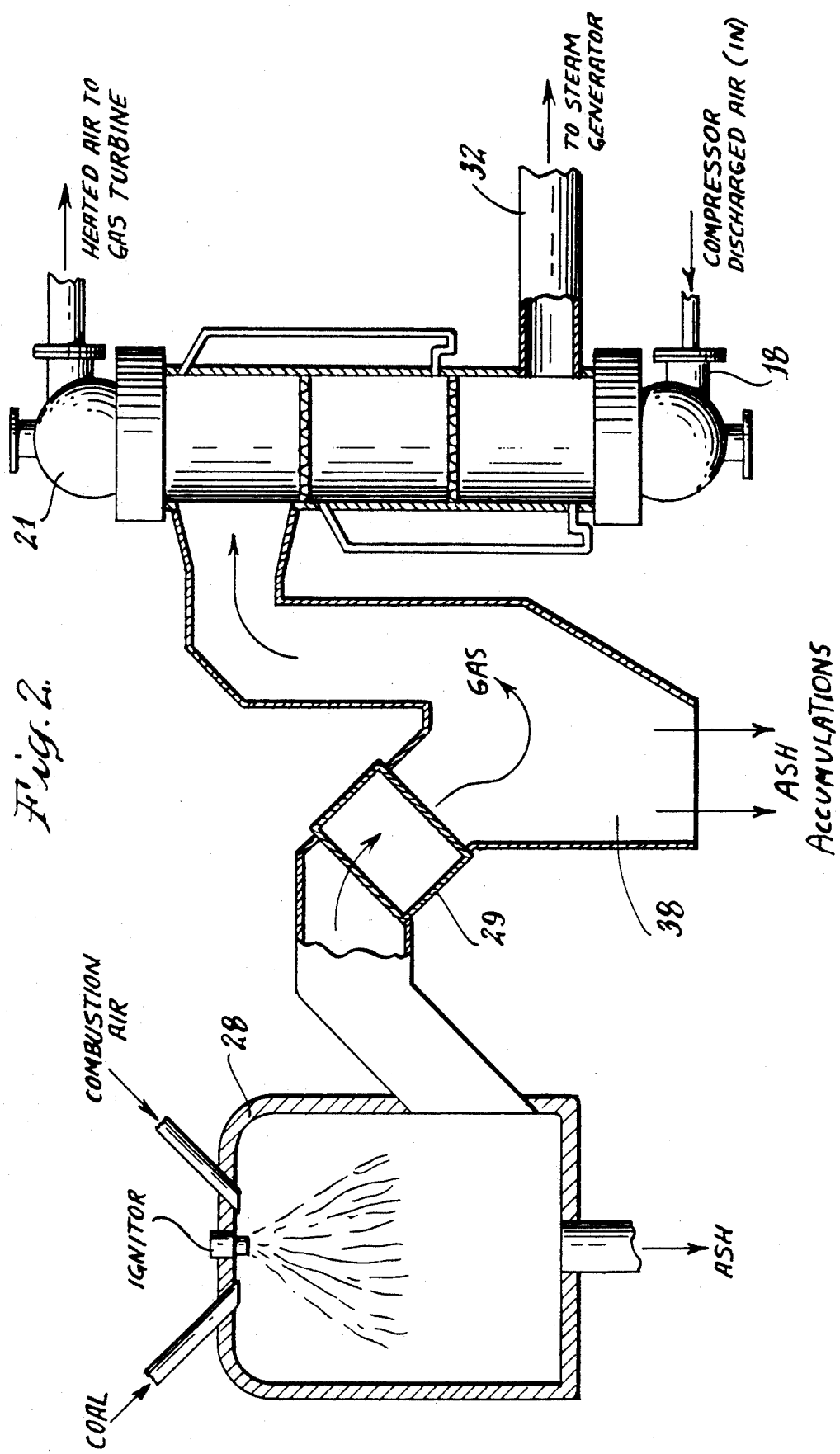

SEPARATION DEVICES

BACKGROUND OF INVENTION

This invention relates to apparatus useful in the field of large boilers of the type that are used by electric utilities to generate electricity and in other industrial applications. In such uses, coal has been a traditional and desirable fuel source economically and strategically because of its great abundance, comparative low cost, and widespread availability in the United States. More recently, natural gas and oil distillates have become used as fuel sources, particularly as greater emphasis has been placed on reducing contaminants and other unwanted constituents from the effluent gases that are produced in quantity by such installations when they use coal. That trend and efforts to improve the efficiency of power plants have led to the concept of using combustion gases directly to drive generating turbines without going through the intermediate step of using the fuel to generate steam first. Thus conventional generating systems use the Rankine Cycle, wherein coal is used to generate steam which then drives the turbine generators, have been combined with so-called direct fired Brayton Cycle systems, where a fossil fuel heat source drives a turbine directly without the intermediate step of steam generation, with the remaining heat in the spent gas from the direct fired Brayton cycle being used as an energy source for the associated Rankine cycle system. Systems having such combinations of direct fired Brayton and "bottoming" Rankine systems are generally referred to as Combined Cycles. While more efficient thermodynamically, a major drawback of this approach is that currently gas turbines or direct fired Brayton cycle systems are generally not adapted to the use of solid fuels because of the high probability of the deposition of ash on the blades of the turbine which occurs if solid fuels are used at normal operating temperatures to heat directly the gas which drives the turbine. To avoid this, comparatively expensive and strategically more critical fuels, such as natural gas and distillate fuels, have had to be used, since alternative approaches to the traditional methods of burning coal so as to use it as the direct heat source in such Brayton Cycle systems have also proved to be unsatisfactory. For example, coal gasification with removal of the ash constituents is cost competitive only for large size plants. Alternatively, subjecting the coal to pressurized, fluidized bed processes produces maximum temperatures about 1750 F which is far below the 2300 F needed to satisfy the needs of a modern gas turbine to achieve high efficiency in the operation of the gas turbine. More recently, there has emerged an alternative approach to heating the turbine working fluid in which the fluid would be heated indirectly or through a heat exchanger. Power plants of this type have been studied since the 1930's in an effort to utilize high thermally efficient gas turbine cycles with solid ash bearing fuels. This approach, referred to as an Externally Fired Combined Cycle ("EFCC"), utilizes a heat exchanger as a means to transfer heat to the gas which impels the turbine while, at the same time, isolating the ash and other contaminants from the turbine itself. In this concept, taken, for example in the context of turbine generator power plant, clean, filtered air is admitted into the compressor section of an externally fired gas turbine where it is pressurized and raised to a temperature of about 375 degrees (C). This flow in the preferred embodiment becomes the tube-side flow through a shell and tube heat exchanger, where the air in the tubes is raised by transfer of energy through the tubes to a temperature of about 1200 degrees C. (approximately) and then admitted into the turbine section where it is expanded to drive the turbine and generate electricity. This gas exits the turbine at about 540 degrees C. and at a slight pressure above atmospheric, with part of it being supplied to a solid fuel (e.g., coal) combustor, where the energy supplied by the fuel raises the gas temperature to above 1350 degrees C. The products of this combustion process flow through the shell side of the heat exchanger and there become the source of heat that is imparted to the high pressure compressor discharge air in the tubes. From the shell side of the heat exchanger, the gas flows into the heat recovery steam generator comprised of one or more superheaters, evaporators and economizers. As noted above, a chief difference between the indirect approach and the earlier direct concept is the elimination of the introduction of combusted fuel gases containing ash into the turbine. That is, the ash and other contaminants are kept from the turbine blades and other elements of the interior of the turbine comprising the gas path, since the air from the EFCC which the turbine "sees" is isolated from the combustion of the external firing by the interposed heat exchanger.

In the earlier, indirect fired systems, operating temperatures were much lower than those to which the technology has now evolved, so that high temperature alloy steel air heaters could perform reliably. However, metallic heat exchangers do not permit sufficiently high temperatures to satisfy the requirements of today's high performance gas turbines, particularly the so-called aircraft derivative machines that have been developed for industrial use. The use of ceramic air heaters can circumvent this obstacle since ceramics can endure temperatures well above 1370 C. in the chemically harsh environment produced by the combustion of coal. The physical properties inherent to ceramic materials make tube type heat exchangers the preferred form of such structures for such uses, and experience has shown them to exhibit good durability. However, when so applied, the ash build-up which occurs on the tubes progressively inhibits their efficiency as heat exchange elements. This indicates a need for an ash collection system "up-stream" of the heat exchanger in EFCC installations to avoid such ash build up on the ceramic tubes.

Accordingly, it is an object of this invention to provide structures to collect ash from a stream of gas. It is a further object of this invention to provide such structures which are particularly adapted for use in collecting coal ash. Yet another object of this invention is to provide means which will satisfy one or more of the foregoing objectives that is adapted for use in high temperature environments. Still another object of this invention is to provide means which will satisfy one or more of the foregoing objectives and is self-cleaning.

STATEMENT OF INVENTION

Desired objectives may be achieved through practice of this invention, embodiments of which include a slag screen that is adapted to form part of the flow path for an ash-laden stream of gas. The screen, positioned within a housing having ingress and egress apertures, includes rods, tubes or other structures having collection surfaces made from material such as ceramic which is tolerant to the temperature and ambient conditions to which they will be exposed. They are so arrayed as to form an impact separator having tortuous paths for the gas passing through the housing, whereby the inertia of ash particles causes them to resist the changes in direction of the carrier gas stream in which they are entrained. The ash particles, which include constituents that inherently are sticky, impinge upon and stick to the rods. The rods are adapted to being heated, as by comprising material which will convert applied electrical energy into heat. When so heated, the rods cause certain constituents of the ash accumulated thereon to soften, particularly at the interface between the rods and the ash deposits. This weakens the adhesion of the ash accumulations to the collection surfaces and induces spalling by which accumulations separate from the rods. The ash accumulations, due to their comparatively large size and weight, fall to the bottom of the duct into a receptacle rather than being reintrained by the gas flowing through the device. In that form, the ash residue may be gathered for subsequent disposal.

DESCRIPTION OF DRAWINGS

This invention may be understood from the description which follows and from the accompanying drawings in which FIG. 2 illustrates in greater detail the portion of the apparatus shown in FIG. 1 in which the embodiment of this invention is used.

DESCRIPTION OF PREFERRED EMBODIMENTS

Figure 1:
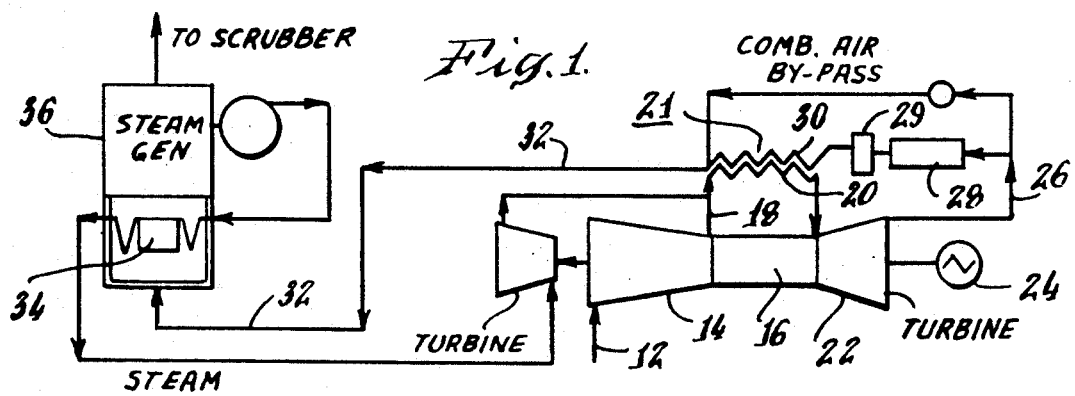
FIG. 1 illustrates an installation in which an embodiment of this invention is used.

Referring first to FIG. 1, there is shown a schematic drawing of a portion of an electric power generation installation of a type known as an "Externally-Fired Combined Cycle" ("EFCC") in which embodiments of this invention may be used. In this design, clean, filtered air is admitted via an inlet 12 into the compressor section 14 of an externally fired gas turbine system 16, where it is pressurized and raised by compression to a temperature of about 375 degrees C. This flow exits the compressor section 14 via piping 18 to pass through the tubes 20 of a shell and tube heat exchanger 21 that preferably are made from ceramic materials. The gas in the tubes 20 is raised to a temperature of about 1100 degrees C., and then admitted into the turbine section 22 where it is expanded to drive apparatus including the generator 24 to produce electricity. This gas exits the turbine via ducts 26 at about 540 degrees C. and at a pressure slightly above atmospheric. Part of it is supplied to a solid fuel (e.g., coal) combustor 28, where the energy supplied by the fuel raises the gas temperature to above 1370 degrees C. After first having passed through a slag screen 29 of a type which embodies this invention as hereinafter described in greater detail, the products of this combustion flow to and through the shell side 30 of the same heat exchanger and there become the source of heat which is transferred to the compressor discharge air as it flows through the tubes 20. From the shell side 30 of the heat exchanger, the gas flows via ducts 32 into the super heater section 34 of the heat recovery boiler 36.

FIG. 2 shows in greater detail the portion of the apparatus shown in FIG. 1 in the region between where the turbine air from the duct 26 enters the coal combustor 28 and passes through the slag screen 29 and the heat exchanger 21. As shown, the slag screen 29 processes all gas passing to the ceramic heat exchanger 21. In this region, temperatures are typically in the range of 1450 C. and the gas stream has a velocity of 90 to 400 feet per second.

Figure 4:
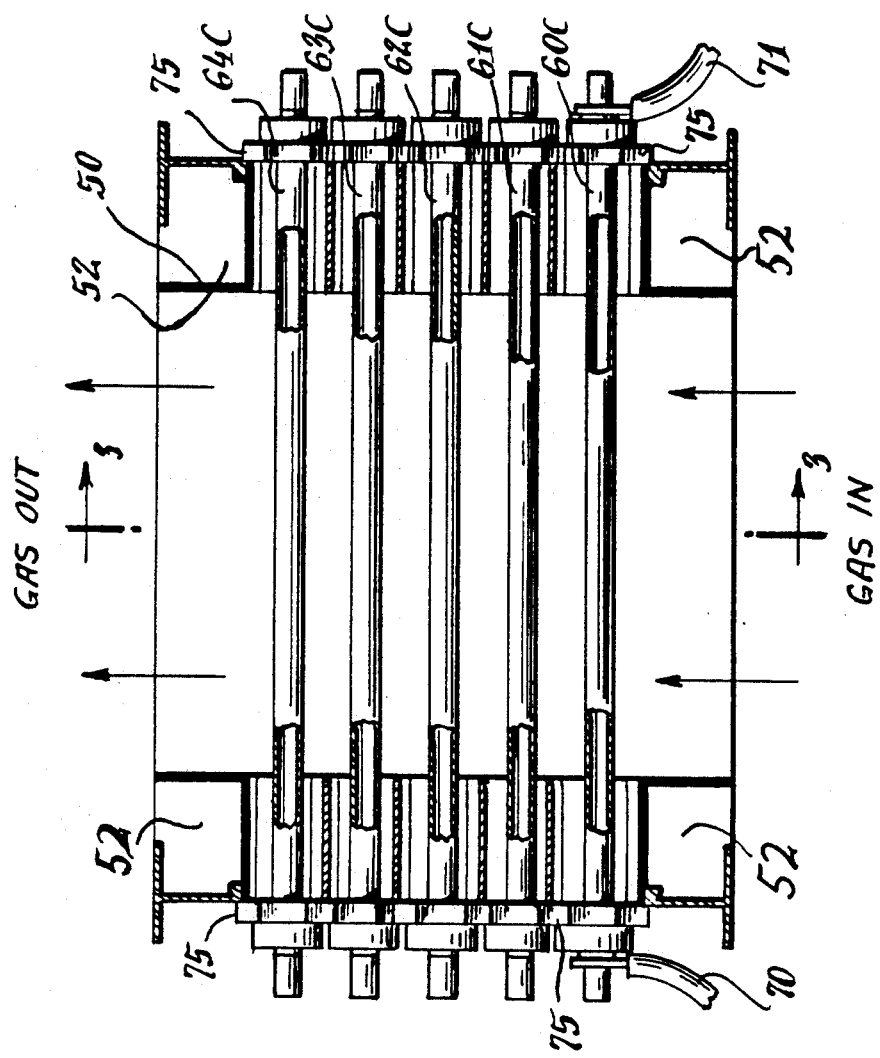
FIG. 4 illustrates a cross-sectional view through line 4—4 of the embodiment of this invention shown in FIG. 3.
Figure 3:
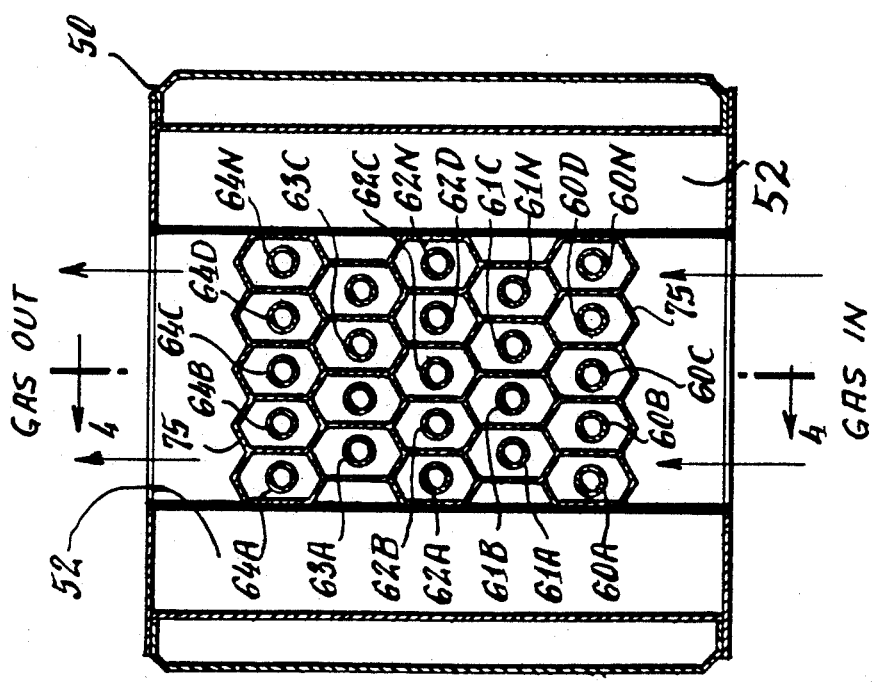
FIG. 3 illustrates a cross-sectional view through line 3—3 of the embodiment of this invention shown in FIG. 4.

The internal structure of the slag screen 29 is shown in greater detail in FIGS. 3 and 4. It will be seen there that the slag screen 29 includes an outer housing having a steel frame 50 filled, for thermal insulation, with cast ceramic material 52 in which are positioned vertically stacked, spaced-apart, horizontally oriented ceramic rods or tubes $60a$, $60b$, $60c$ ... $60n$; $61a$, $61b$ ... $61n$; $62a$, $62b$ ... $62n$; ... (etc.). These rods or tubes are held in place by support blocks 75 that are so shaped and positioned as to hold them by their ends in their desired locations as shown. Thus, while the blocks 75 are more or less hexagonal in shape to adapt them for aligned stacking with assurance they will stay in place without any adhesive material between them, others may be shaped to serve their respective functions, such as fitting into a support frame, lying flat along a floor, etc. The rods and the support blocks may be made from ceramic or other high temperature, structurally sound material, such as silicon carbide which is preferred for the rods in particular because of its resistance to temperature, its stability in chemically aggressive environments, and (as is hereinafter elaborated) its ability to be heated up by the direct application of electrical energy. It is noted that the rods may be in the form of (solid) rods, or (hollow) tubes, and that although square or rectangular or other cross-sectional shapes may be used, circular, elliptical or tear-drop shaped cross sections usually are preferred because of their improved aerodynamic properties for reasons which will be apparent from what follows. Whichever among the various tenable selections are made, the word "rod" as used herein is intended to embrace any and all of them, whether solid or hollow. It should also be as to design and material as to be heatable, whether by the direct application of electrical or other energy or by supplementary heating means. The axes of each of the rods comprising each vertical stack of rods are offset horizontally with respect to those of rods in the vertical stack next adjacent to it. The size, spacing and placement of the rods with respect to each other are within the competence of those ordinarily skilled in the cognizant arts in working out acceptable engineering compromises between such considerations as close spacing and larger tube sizes for improved collection efficiency versus higher resulting drag forces. Other factors involved in these considerations involved in these specifications, such as the shape of ash build-up, will also be within the competence of those with such skills. Thus, the rods comprising the second vertical stack shown in FIG. 3 (i.e., $61b$, $63b$) are about one or more tube diameters apart from those comprising the first vertical stack (i.e., $60a$, $62a$, $64a$). Similarly, the rods of the third vertical stack ($60c$, $62c$, 64c) are horizontally offset from those of the second stack). This sequence is carried out throughout the device and thereby tortuous paths are created through which the air is forced to flow. The effect of this arrangement is illustrated by the lines of gas flow shown in FIGS. 3 and 4 into the ingress opening at the bottom of the screen housing, through the arrays of rods, and out through the egress opening in the top of the device. In that process, the comparatively high inertia of the ash particles tends to overcome the fluid drag forces, which are proportional to the projected area of the particles and act to "sweep" the particles past the tubes. Hence, the drag forces presented by the velocity of the fluid which act on the mass of the particles may be balanced to create an impact separator in which ash particles are propelled into and retained by intercepting surfaces (in this case, the outer walls of sequential bar stacks) while the rest of the gas continues through the device. Such separators are particularly effective for removing particles from 5 or more microns in size.

This collection/deposition effect is the result of two processes: particle arrival and particle adhesion. Particle adhesion, in turn, may be further subdivided into "reentrainment" and "spalling". Reentrainment refers to the transport from the collector surfaces and into the gas stream of slag "droplets" of substantially the same size and chemical form as the entrained slag. Spalling refers to the release of larger, partially fused chunks which are removed from the collector surfaces. Available evidence indicates that the latter phenomenon is unlikely to be a factor with coal slag that has passed the early stages of sintering on the collector surfaces. Therefore, the more important issue to be addressed is that of reentrainment of slag which has not yet passed the early stages of sintering. Of course, it is to be remembered that these same phenomena will operate as to gas passing through the shell side of the heat exchanger previously described as they do in slag screens which embody this invention since, structurally, they present similar environments.

Figure 6:
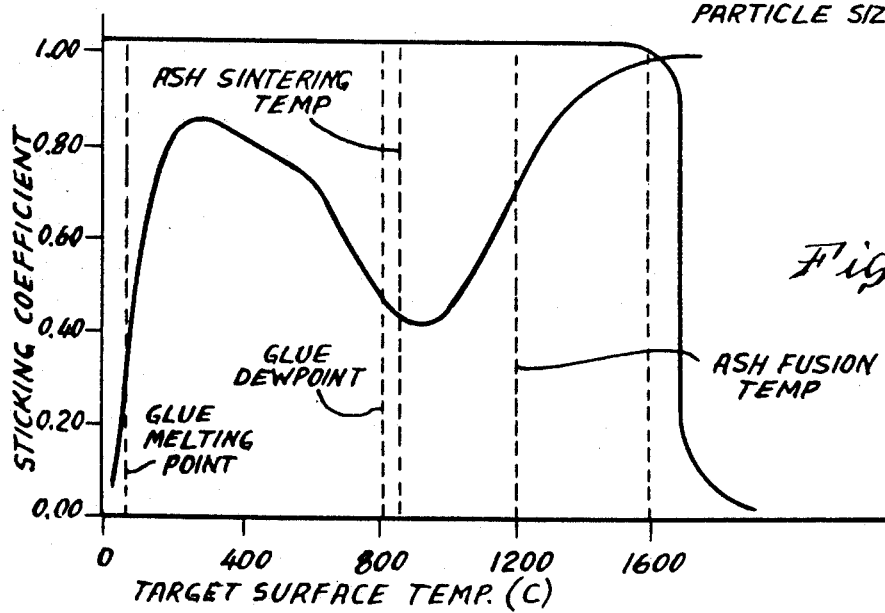
FIG. 6 is a graph of Adhesion and Sticking Coefficients vs. Target Surface temperatures applicable to embodiments of this invention.

Research into these phenomena has produced the concept of a "sticking coefficient", which is defined as the probability that a particle which impacts a collector surface will remain attached to that surface. It is known that coal ash is a multiple compound, some elements of which soften at lower temperatures than others. Thus, while coal ash may be said to be inherently sticky, the degree of stickiness will vary as between different coal lots, as well as with changes in temperature. In FIG. 6, which illustrates the effect on such coefficients as the heat of coal ash is progressively raised through temperatures which result in various changes as noted in the physical state of the ash, the data given are representative of those for the ash of Eastern Bituminous coal. FIG. 6 illustrates that some of the constituents of the ash are susceptible to being softened at lower temperatures and to becoming progressively more fluid as their temperature rises. FIG. 6 also includes a curve demonstrating that the adhesion of ash material drops at a temperature below that at which the sticking coefficient begins to drop materially. As a result, the ash material exhibits a high sticking coefficient until after it begins to loose its adhesion capability. In the present invention, these phenomena are utilized to weaken the adhesion of accumulated ash, which may be 6 to 15 cm or more thick. According to well known principles of engineering, an amount of electrical energy may be applied to the rods individually, in groups, simultaneously, or sequentially, that is sufficient, given the desired time and temperature, and electrical resistance, to bring their collection surfaces to the desired temperature to release the ash deposits. By periodically heating the rods to temperatures typically as high as about 1870 C. so that the portion of ash accumulation next to the rod surfaces is softened, a kind of spalling occurs in which the accumulations of ash loose their adhesion to the collection surfaces and the ash falls away from the rods in clumps rather than as reintrained ash particles. As such, they do not become airborne or reintrained in the gas stream but, instead, drop to the bottom of the apparatus for subsequent collection and disposal. and disposal. The design of embodiments of this invention such as shown in FIGS. 3 and 4 takes the flow of gas into account by positioning the rods according to known per se technology so that few or no such clumps falling away from any given rod will land on any other rod.

It should be noted here that in addition to the comparatively high efficiency of these devices in terms of heat utilization and recovery, they also are environmentally correct. They collect many residue constituents, some of which are in the form of inorganic ash and many of which are non-homogenous and therefore difficult to accumulate. In the embodiments of FIGS. 3 and 4, a means is shown for heating the rods of a slag screen according to this invention. In a preferred embodiment, a selected property of ceramic materials otherwise suitable for use in the practice of this invention, is appropriate electrical resistance with resulting internal heat generation upon the application thereto of electrical energy. Thus, there is depicted electrical power leads 70, 71 affixed to the ends of rod 60c according to known per se techniques, by which electrical power may be supplied to that rod to cause it to heat up. Of course, similar energy supply means may be provided for each of the other such rods in the device. In addition, or in the alternative, the rods may be heated by the inclusion of supplementary means, such as electrical wire resistance heating elements. It is also within the contemplation of this invention that the rods may be composite structures, for example, with a strength core and an outer ceramic layer to provide the desired collection surface. By this means, the rods may be heated as desired to the melting temperatures of the "glue" agents in the coal as laden gas that is being processed, thus enhancing the ash collection, retention and removal capabilities of the device. The means by which the rod ends are held may be spring loaded, or pneumatically or hydraulically or other wise actuated, or otherwise biased to retain its hold on them against thermal expansion of the rods.

It has previously been mentioned that due to its structural configuration, the exterior of the tubes in the heat exchanger 21 can, to some degree at least, also be expected to function as an impact separator, somewhat in the same way, if not to the same extent, as the slag screen. It should be noted in FIG. 2 that after the ash laden gas passes through the slag screen 29, it is allowed to slow down, with consequent reductions in velocity (typically, 15 m/sec.–60 m/sec.). Since impact separator efficiency is a function of particle diameter, particle density, gas stream velocity and impact target size, the effect of this velocity reduction on any ash particles which succeed in passing through the slag screen is to reduce their tendency to impact the exterior of the tubes in the heat exchanger with consequent ash build up which would render heat transfer inefficient and block gas flow through it.

Figure 5:
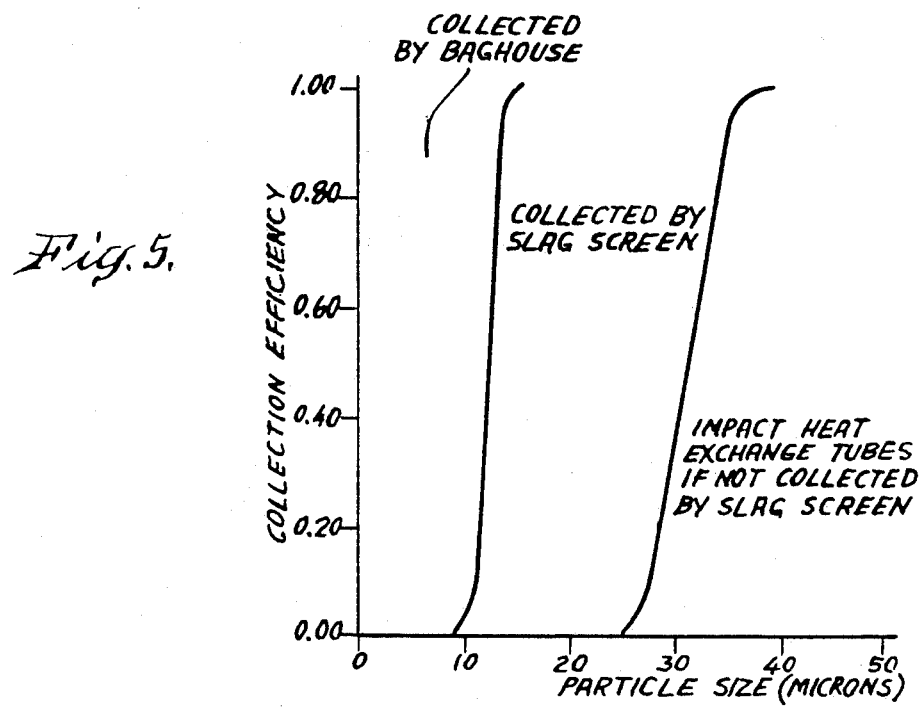
FIG. 5 is a graph of particle size collection efficiency of embodiments of this invention.

It is known that some of the larger coal ash particles may exceed 15 microns in size, and that an average size may be assumed to be about 10 microns. At this size, in the system described, the majority of ash particles will pass directly through the slag screen and the heat exchanger to be collected in a bag house. Thus, since the products of combustion exit the coal combustor 28 shown in FIGS. 2 and 3 with a relatively high velocity, small particles will be carried by the hot gas stream into the slag screen, where particles larger than about 12 microns will impact the slag screen rods. This value also represents the smallest particles that will impact the heat exchanger tubes, plus an engineered safety factor to better ensure capture of all particles within the size range. Gas exiting the slag screen is directed to an ash collection area 38, and then, as previously described, passes through a region of lowered velocities as a result of which the heat exchanger tubes exhibit a markedly poorer impact collection efficiency. A few of the particles that are over 30 microns in size and have managed to traverse the entire travel path to that point may impact the heat exchanger tubes, but their number is comparatively small, given the normal distribution curve of particle sizes. As is summarized in FIG. 5, particles less than about 12 microns may be collected in a bag house, while those above 12 microns are substantially entirely removed by the slag screen. To the extent they are not, they are, for the most part, simply swept around the tubes in the heat exchanger by the accompanying flow of gas therethrough. Particles in the size range between 12 and 30 microns are collected by the slag screen and may be considered the "safety factor" referred to above.

From this description, it will be seen that through practice of this invention, it is possible to utilize more effectively heat exchangers and other devices involving the transfer of heat from gases laden with heat softenable particles or droplets that will adhere to each other and to their internal surfaces. Thus, it is to be understood that the embodiments herein shown and discussed are by way of illustration and not of limitation, and that a wide variety of embodiments may be made without departing from the spirit or scope of this invention.

We claim:

1. A slag screen for removing slag from an slag-bearing stream of gas comprising
    a multiplicity of rods having collecting surfaces made from material which is tolerant to the high temperature and other ambient conditions to which they will be exposed, said rods
        being arrayed so as to form an impact separator having tortuous paths for the passage of a slag-bearing stream of gas therethrough whereby slag entrained in said gas impinges upon and sticks to said collecting surfaces of the rods, and
        being adapted for their collection surfaces to be heated to temperatures sufficient to cause slag accumulated on said collecting surfaces of said rods to loose its adhesion thereto and to separate therefrom,
    and energy means for heating said collection surfaces of said rods to temperatures sufficient to cause slag accumulated on said collecting surfaces to loose its adhesion thereto and to separate therefrom.

2. The device described in claim 1 wherein said collection surfaces of said rods are adapted to be so heated by the inclusion in the structure of said rods of material which is self heating upon the direct application of electrical energy thereto, and wherein said energy means for so heating same comprise electrical source connection means.

3. The device described in claim 2 wherein said self heating material is ceramic material comprising said collecting surfaces.

4. The device described in claim 3 wherein said self heating material is ceramic material comprising the rods themselves.

5. The device described in claim 1 wherein said rods comprise ceramic material.

6. The device described in claim 2 wherein said rods comprise ceramic material.

7. The device described in claim 5 wherein said rods are so oriented as to form successive rows across the flow path of said ash-laden gas, in each of which rows the constituent rods are spaced apart from each other and each rod in each row is aligned with a space between the rods of each row which next precedes it.

8. The device described in claim 6 wherein said rods are so oriented as to form successive rows across the flow path of said ash-laden gas, in each of which rows the constituent rods are spaced apart from each other and each rod in each row is aligned with a space between the rods of each row which next precedes it.

9. A slag screen device for removing slag from a slag bearing stream of gas comprising
    an outer housing having gas ingress and gas egress apertures in opposing walls thereof,
    a multiplicity of rods having collecting surfaces made from material which is tolerant to the high temperature and other ambient conditions to which they will be exposed, said rods
        being arrayed within said housing so as to form an impact separator having tortuous paths for the passage of a slag bearing stream of gas therethrough whereby slag entrained in said gas impinges upon and sticks to said collecting surfaces of the rods, and
        being adapted for their collection surfaces to be heated to temperatures sufficient to cause slag accumulated on said collecting surfaces of said rods to loose its adhesion thereto and to separate therefrom,
    energy means for heating said collection surfaces of said rods to temperatures sufficient to cause slag accumulated on said collecting surfaces to loose its adhesion to them and to separate therefrom, and support means for supporting said rods so arrayed, said support means being made from materials which is tolerant of the ambient conditions to which it is exposed.

10. The device described in claim 9 wherein said collection surfaces of said rods are adapted to be so heated by the inclusion in the structure of said rods of material which is self heating upon the direct application of electrical energy thereto, and wherein said energy means for so heating same comprise electrical source connection means.

11. The device described in claim 10 wherein said self heating material is ceramic material comprising said collecting surfaces.

12. The device described in claim 11 wherein said self heating material is ceramic material comprising the rods themselves.

13. The device described in claim 9 wherein said rods comprise ceramic material.

14. The device described in claim 10 wherein said rods comprise ceramic material.

15. The device described in claim 13 wherein said rods are so oriented as to form successive rows across the flow path of said ash-laden gas, in each of which rows the constituent rods are spaced apart from each other and each rod in each row is aligned with a space between the rods of each row which next precedes it.

16. The device described in claim 14 wherein said rods are so oriented as to form successive rows across the flow path of said ash-laden gas, in each of which rows the constituent rods are spaced apart from each other and each rod in each row is aligned with a space between the rods of each row which next precedes it.

17. A method of removing slag from slag-bearing gas comprising the steps of causing a slag-bearing stream of gas to pass through a multiplicity of rods that have collecting surfaces made from material which is tolerant to the high temperature and other ambient conditions to which they will be exposed and are arrayed so as to form an impact separator having tortuous paths for the passage of a slag-bearing stream of gas therethrough and are adapted for their collection surfaces to be heated to temperatures sufficient to cause slag accumulated on said collecting surfaces of rods to loose its adhesion thereto and to separate therefrom, and heating said rods to temperatures sufficient to cause slag accumulated on said collecting surfaces to loose its adhesion thereto and to separate therefrom.

18. The method described in claim 17 wherein said step of heating said rods comprises the direct application of electrical energy to said rods which are made from ceramic material that is self heating.

19. The method described in claim 18 wherein said step of heating said rods occurs according to a prescribed sequence in which fewer than all of said rods are so energized at any given time.

* * * * *